United States Patent
Shinoda et al.

(10) Patent No.: US 8,577,125 B2
(45) Date of Patent: Nov. 5, 2013

(54) METHOD AND APPARATUS FOR IMAGE GENERATION

(75) Inventors: Shinichi Shinoda, Hitachi (JP);
Yasutaka Toyoda, Hitachi (JP); Ryoichi Matsuoka, Yotsukaido (JP)

(73) Assignee: Hitachi High-Technologies Corporation, Tokyo (JP)

( * ) Notice: Subject to any disclaimer, the term of this patent is extended or adjusted under 35 U.S.C. 154(b) by 863 days.

(21) Appl. No.: 12/344,000

(22) Filed: Dec. 24, 2008

(65) Prior Publication Data
US 2009/0202137 A1    Aug. 13, 2009

(30) Foreign Application Priority Data
Dec. 26, 2007   (JP) ................................. 2007-333426

(51) Int. Cl.
*G06K 9/00*   (2006.01)

(52) U.S. Cl.
USPC ........................................................ 382/147

(58) Field of Classification Search
USPC ................................................ 382/145, 147
See application file for complete search history.

(56) References Cited

U.S. PATENT DOCUMENTS

| | | | |
|---|---|---|---|
| 5,523,567 A * | 6/1996 | Kawamata et al. | 250/310 |
| 6,987,874 B2 | 1/2006 | Hirose et al. | |
| 7,683,471 B2 * | 3/2010 | Chung et al. | 257/688 |
| 2006/0045326 A1 * | 3/2006 | Toyoda et al. | 382/145 |
| 2006/0045388 A1 * | 3/2006 | Zeineh et al. | 382/312 |
| 2006/0245636 A1 * | 11/2006 | Kitamura et al. | 382/149 |

FOREIGN PATENT DOCUMENTS

| | | |
|---|---|---|
| JP | 2001-128106 | 5/2001 |
| JP | 2003-098112 | 4/2003 |
| JP | 2004-333446 | 11/2004 |

\* cited by examiner

*Primary Examiner* — Tari Fur Chowdhury
*Assistant Examiner* — Jonathan Hansen
(74) *Attorney, Agent, or Firm* — McDermott Will & Emery LLP

(57) ABSTRACT

The present invention provides a technique to generate an accurate connected image even in a monotonous pattern using design data as constrained conditions. A reference position is roughly determined through matching between the design data and image data, matching between neighboring images is performed using the amount of mismatch from the design data as a searching range and a connected image is generated at high speed and accurately. The image generation method of the present invention is an image generation method for inspecting an electronic device pattern using a scanning electron microscope and is constructed of a design data file that stores design data describing layout information of an electronic device pattern by inputting the data, a plurality of divided pieces of image data obtained by imaging the electronic device pattern at different imaging positions, and image connecting means for connecting the plurality of divided pieces of image data into one image using the plurality of divided pieces of image data and the design data of a file of the design data (see FIG. 1).

13 Claims, 14 Drawing Sheets

(a)

(b)

(c)

(d)

(e)

(f)

(a)

(b)

METHOD AND APPARATUS FOR IMAGE GENERATION

BACKGROUND OF THE INVENTION

1. Field of the Invention

The present invention relates to a method and image generation apparatus that images and inspects an electronic device pattern at arbitrary positions on a sample using a critical-dimension scanning electron microscope (CD-SEM) or the like.

2. Background Art

Conventionally, critical-dimension scanning electron microscopes (CD-SEM) or the like are widely used to measure and inspect workmanship of a high-precision wiring pattern formed on a semiconductor wafer. Process micronization in semiconductor devices is currently advancing to an extent that 65 nm products are being mass-produced. As the process becomes finer, defects or the like to be inspected also become smaller and magnification in imaging cannot help but be increased. On the other hand, when carrying out a layout simulation of a wiring pattern, there is a need for conducting the simulation over a wide range. Furthermore, in order to conduct detailed simulations in the future, images are apparently preferred to be acquired at high magnification. However, when imaging is performed at high magnification, a part that fits into a screen becomes smaller, and the image cannot be seen over a wide range.

Furthermore, JP Patent Publication (Kokai) No. 2001-128106A proposes a method of acquiring an overall image at low magnification and then acquiring divided images at high magnification. According to this method, pasting positions can be identified for even a monotonous pattern with reference to the overall image. However, the overall image needs to be read at changed magnification. Furthermore, while imaging a mask causes no problem, imaging a wafer causes a problem with charge and when read once, the image may be disturbed, and therefore it is preferable to adopt a method that could avoid reading the overall image whenever possible.

SUMMARY OF THE INVENTION

As a method of solving this problem, JP Patent Publication (Kokai) No. 2003-098112A proposes a method of obtaining a detailed image at high magnification over a wide range by dividing an image into a plurality of portions and pasting them together based on position information of a stage. However, although the amount of movement of the stage is quite accurate, there is a mismatch when viewed in nm units and when the images imaged at high magnification are pasted together, the images are misaligned with each other and lines are cut at the pasting positions. When carrying out a detailed simulation, a mismatch of even one pixel is not preferable, and this method cannot be used. Furthermore, the method described in JP Patent Publication (Kokai) No. 2004-333446A images a plurality of regions such that images overlap with images of neighboring regions, performs matching processing in the overlapping regions, and can thereby obtain consistent, high magnification and detailed images over a wide range. However, since a wiring pattern includes many monotonous images, when matching processing is performed in the overlapping regions, a plurality of pasting candidates with high matching rates may appear. In that case, it is difficult to distinguish which positions correspond to actual pasting positions and there is a problem that when two or more images are connected, some images always mismatch in the overall image.

The present invention provides a technique to obtain an accurate connected image when measuring and inspecting a high accuracy wiring pattern formed on a semiconductor wafer, even when measuring a monotonous pattern such as a wiring pattern.

In order to attain the above described object, the image generation method for an electronic device pattern using an electron microscope of the present invention stores design data describing layout information of an electronic device pattern, stores a plurality of divided pieces of image data obtained by imaging the electronic device pattern at different imaging positions and connects the plurality of divided pieces of image data into one image using the plurality of divided pieces of image data and the design data in a file of the design data.

Furthermore, the image generation method of the present invention performs, when performing the image connection, first matching processing of performing matching between the plurality of divided pieces of image data obtained by dividing and imaging the electronic device pattern provided with an overlapping region in which neighboring image regions overlap each other and design data including the imaged divided image pattern, and second matching processing of performing matching using image data in the overlapping region between the divided images.

Furthermore, when performing the image connection, the image generation method of the present invention obtains, in the first matching processing, a parameter to be used in the second matching processing.

Furthermore, when performing the image connection according to the image generation method of the present invention, a parameter of the second matching processing determined in the first matching processing is information about a reference position and searching range.

Furthermore, in order to attain the above described object, the present invention provides an image generation apparatus for an electronic device pattern using an electron microscope, including design data storing means describing layout information of an electronic device pattern, a plurality of divided pieces of image data storing means obtained by imaging the electronic device pattern at different imaging positions and image connecting means for connecting the plurality of divided pieces of image data into one image using the plurality of divided pieces of image data and the design data in a file of the design data.

Furthermore, the image connecting means in the image generation apparatus of the present invention includes first matching means for performing matching between the plurality of divided pieces of image data obtained by dividing and imaging the electronic device pattern provided with an overlapping region in which neighboring image regions overlap each other and design data including the imaged divided image pattern, and second matching means for performing matching using image data in the overlapping region between the divided images.

Furthermore, in the image generation apparatus of the present invention, the image connecting means obtains a parameter to be used in the second matching means using the first matching means.

Furthermore, in the image generation apparatus of the present invention, a parameter of the second matching means obtained using the first matching means of the image connecting means is information about a reference position and a searching range.

Furthermore, in order to attain the above described object, the image generation apparatus for an electronic device pattern using an electron microscope includes imaging means for imaging an electronic device pattern, imaging position control means for moving the electronic device to be imaged by the imaging means to an imaging position, design data storing means describing layout information of the electronic device pattern, divided image data storing means for storing a plurality of divided pieces of image data obtained by imaging the electronic device pattern at different imaging positions, and image connecting means for connecting a plurality of divided pieces of image data into one image using the plurality of divided pieces of image data stored in the divided image data storing means and the design data of the design data storing means, wherein the imaging position control means changes imaging conditions based on the design data.

Furthermore, in the image generation apparatus of the present invention, when changing imaging conditions, the imaging position control means calculates and decides a feature quantity of a region to be an overlapping region using design data including a pattern of the image to be imaged beforehand, calculates, when the feature quantity is smaller than a specific threshold, the size of the overlapping region in which the feature quantity increases and performs imaging by changing the imaging conditions so as to become the calculated size of the overlapping region.

Furthermore, in the image generation apparatus of the present invention, the feature quantity calculated by the imaging position control means is a pattern shape or the number of patterns.

Furthermore, in the image generation apparatus of the present invention, the imaging position control means detects a feature pattern based on design data including a pattern of an image to be imaged and changes the imaging conditions so as to obtain an overlapping region between images.

Furthermore, in the image generation apparatus of the present invention, the imaging position control means changes the imaging position based on the design data including the pattern of an image to be imaged such that a part of interest comes not to the overlapping region between images but closer to the center of the image.

Furthermore, in order to attain the above described object, the image generation apparatus for an electronic device pattern using an electron microscope includes imaging means for imaging an electronic device pattern, imaging position control means for moving the electronic device to be imaged by the imaging means to an imaging position, divided image data storing means for storing divided image data that stores a plurality of divided pieces of image data obtained by imaging the electronic device pattern, and image connecting means for connecting the plurality of divided pieces of image data stored in the divided image data storing means into one piece of image data, wherein the imaging position control means decides whether or not image connection processing is necessary based on information about a range to be inspected and imaging resolution of the imaging means and sets the imaging position.

Furthermore, in the image generation apparatus of the present invention, when the image connection processing is performed, a user is reported that image connection processing has been performed.

According to the present invention, it is possible to obtain an accurate connected image even with a monotonous pattern such as a wiring pattern.

DESCRIPTION OF SYMBOLS

Figure 1:
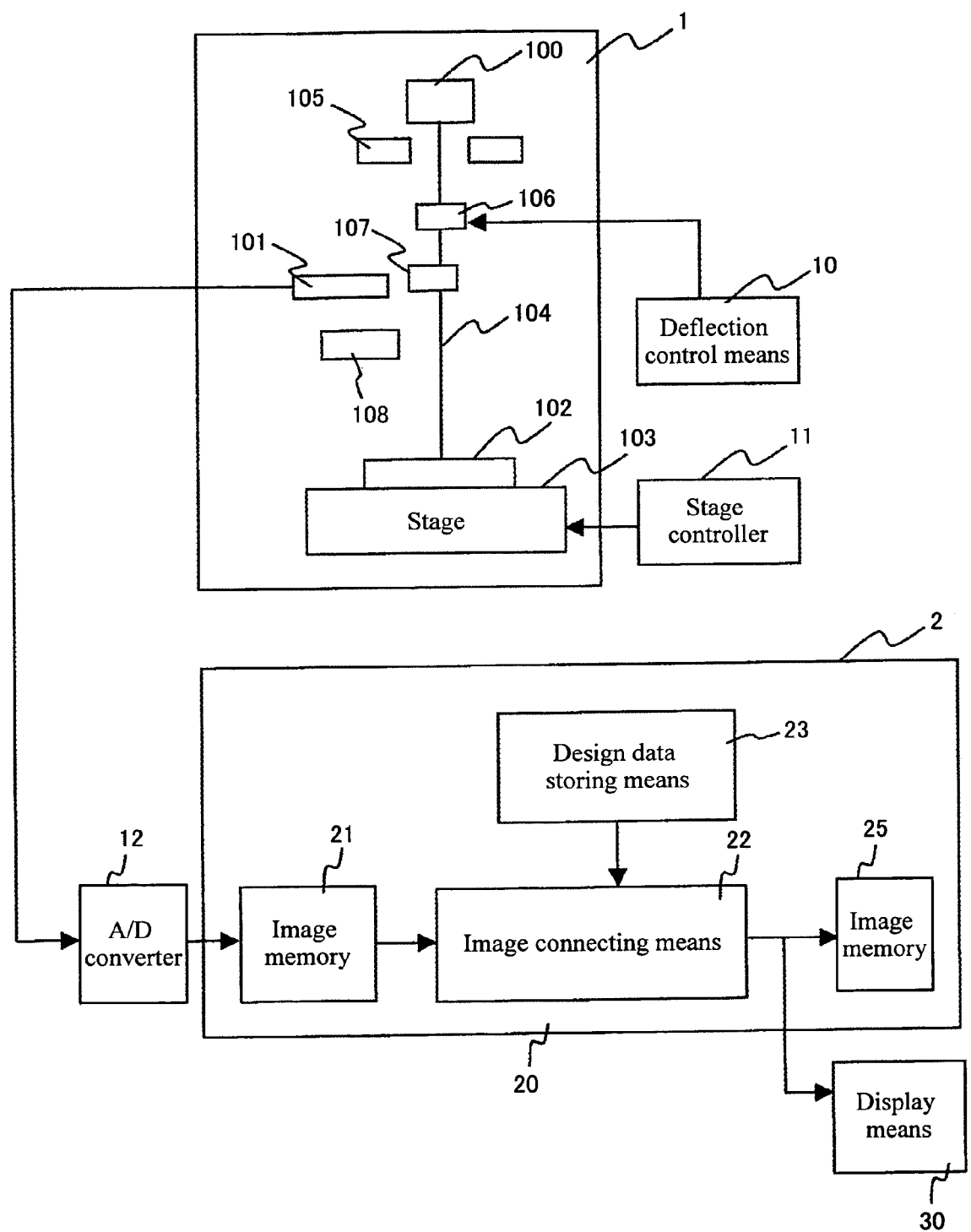
FIG. 1 is a block diagram showing an apparatus configuration of the present invention.

1 Electron optical system
2 Image processing section
10 Deflection control means
11 Stage controller
12 A/D converter
21, 25 Image memory
22 Image connecting means
23 Design data storing means
24 Imaging position changing means
26 Pattern registration section
27 System information storage section
30 Display means
40 Coordinate indicator
50 Acquired image range indicator
60 Image connection processing reporting means
100 Electron gun
101 Secondary electron detector
102 Sample
103 XY stage
104 Electron beam
105 Condenser lens
106 Deflector
107 ExB deflector
108 Objective lens
221 Pixel generation section
222 Expansion processing section
223, 227 Matching processing section
224 Constrained width calculation section
225 Constrained width storage section
226 Memory
228 Connected image generation section
500 Reference coordinate system
501 Pattern 2201 Reference positioning section
2202 Image position mismatch correction section

DETAILED DESCRIPTION OF THE PREFERRED EMBODIMENTS

An embodiment of the method and image generation apparatus using a scanning electron microscope such as an SEM apparatus (critical-dimension scanning electron microscope: CD-SEM) according to the present invention will be explained.

Hereinafter, an apparatus configuration of the present invention will be explained using FIG. 1.

An electron optical system 1 is configured by including an electron gun 100 that generates an electron beam 104, a condenser lens 105 that converges the electron beam 104 generated from the electron gun 100, a deflector 106 that deflects the converged electron beam 104, an ExB deflector 107 for detecting secondary electrons and an objective lens 108 that forms the converged electron beam on a sample (mask and wafer) 102. The sample 102 is placed on an XY stage 103. As a result, the deflector 106 and objective lens 108 control the irradiation position and aperture of the electron beam so that the electron beam is focused and irradiated on an arbitrary position on the sample 102 placed on the XY stage 103. The XY stage 103 moves the sample 102 and allows an image at an arbitrary position of the sample to be acquired.

On the other hand, the sample 102 onto which the electron beam is irradiated emits secondary electrons and reflected electrons, and a secondary electron detector 101 detects the secondary electrons. An A/D converter 12 converts the signal of the secondary electrons detected by the secondary electron detector 101 to a digital signal and an image processing section 2 applies image processing to the signal. The image processing 2 stores the signal converted to the digital signal in an image memory 21.

Here, when a pattern image over a wide range is acquired, if, for example, a pattern image is divided into nine portions and imaged, nine divided pattern images are stored in the image memory 21. To connect these nine divided pattern images into one image, image connecting means 22 connects the divided pattern images using the divided pattern image data stored in the image memory 21 and the design data from design data storing means 23. When the image is divided into nine portions and imaged, the imaging is performed nine times at different imaging positions, and the imaging positions and the imaged divided pattern images are managed in association with each other. Therefore, a rough arrangement of the nine divided pattern images can be known beforehand. The divided pattern images at neighboring imaging positions are connected and eventually connected into one pattern image. The one connected pattern image is stored in an image memory 25 and displayed in display means 30.

Figure 2:
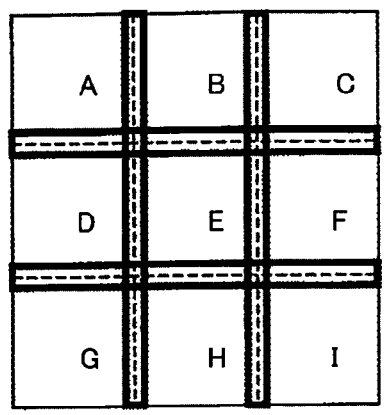
FIG. 2 shows problems with connection processing on wiring patterns.
Figure 2:
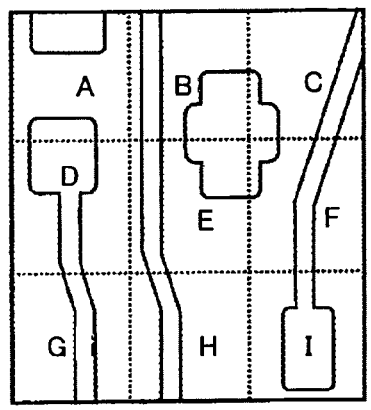
Figure 2:
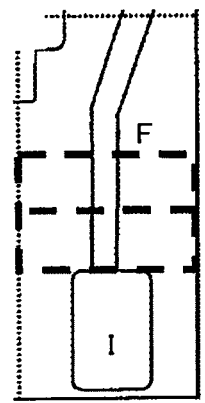
Figure 2:
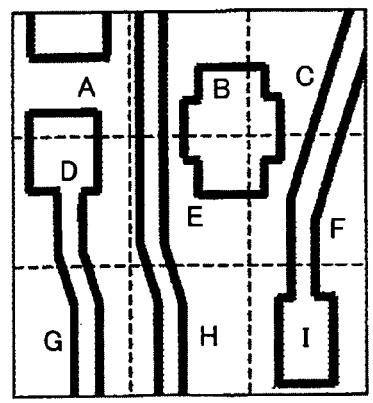
Figure 2:
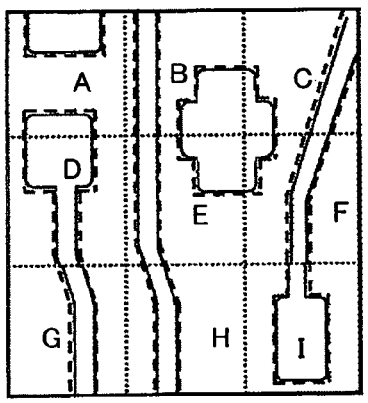
Figure 2:
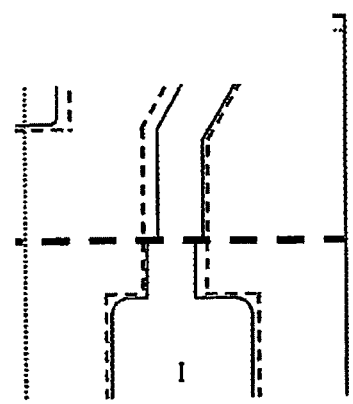

Problems with the connection processing on wiring patterns will be explained briefly using FIG. 2. Here, a case will be explained where nine divided pattern images are connected into one image.

According to the method of connecting images using overlapping regions between images, when the imaging range is divided into nine regions A to I as shown by dashed lines in FIG. 2(a), imaging is performed such that neighboring regions overlap each other in a certain size or greater.

The wiring patterns to be imaged are often linear monotonous patterns as shown in FIG. 2(b). Therefore, the number of monotonous patterns further increases when viewed as overlapping regions between images. For example, an enlarged view of the break between F and I in FIG. 2(b) is shown in FIG. 2(c). Here, assuming that matching is performed between images in the overlapping regions shown by bold dotted lines, the horizontal direction can be identified, whereas in the vertical direction, the matching rate increases at any position and connection positions cannot be identified.

On the other hand, assuming that pattern images are connected using design data, the overlapping regions between images are no longer necessary and since matching is performed between the design data and the entire pattern image, many features may be included. For example, when the design data is converted to pattern images, pattern image shown in FIG. 2(d) are obtained. When the divided images A to I imaged in FIG. 2(b) are matched and overlapped with the pattern images in FIG. 2(d), the connected image can be generated as shown in FIG. 2(e). Dotted lines show the image patterns obtained from the design data and solid lines show divided images pasted together based on the matching result. In this case, the overlapping regions between images are no longer necessary and if there are any features in the image, matching results (pasting positions) are obtained. However, some pattern images in details may not be connected. For example, FIG. 2(f) is an enlarged view of (overlapping region of F and I) at lower right of FIG. 2(e) and the imaged pattern image is the one pasted at the position of matching with the design data, but there is a certain degree of mismatch. The imaged pattern is originally created based on the pattern of the design data, but since the pattern has been deformed, even if matching is performed, the pattern does not completely match. Therefore, it has been thought of combining the aforementioned method of performing matching based on the overlapping regions between pattern images and a method of performing matching between the pattern images created from the design data and the imaged pattern images.

Figure 3:
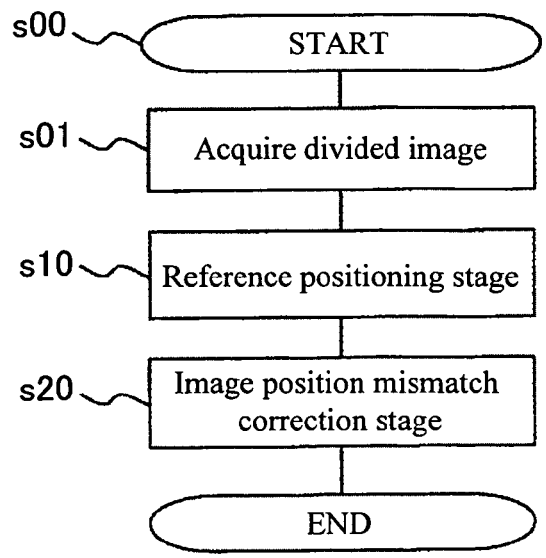
FIG. 3 shows an overview of image connection processing of the present invention.

FIG. 3 shows an overview of image connection processing. First, after acquiring a divided image in s01, matching is performed between a pattern image created from the design data in a reference positioning stage in s10 and an imaged pattern image and positioning is roughly performed as the reference position. After that, matching is performed based on the overlapping region between the pattern images imaged in an image position mismatch correction stage in s20 and the reference position is finely adjusted.

Figure 4:
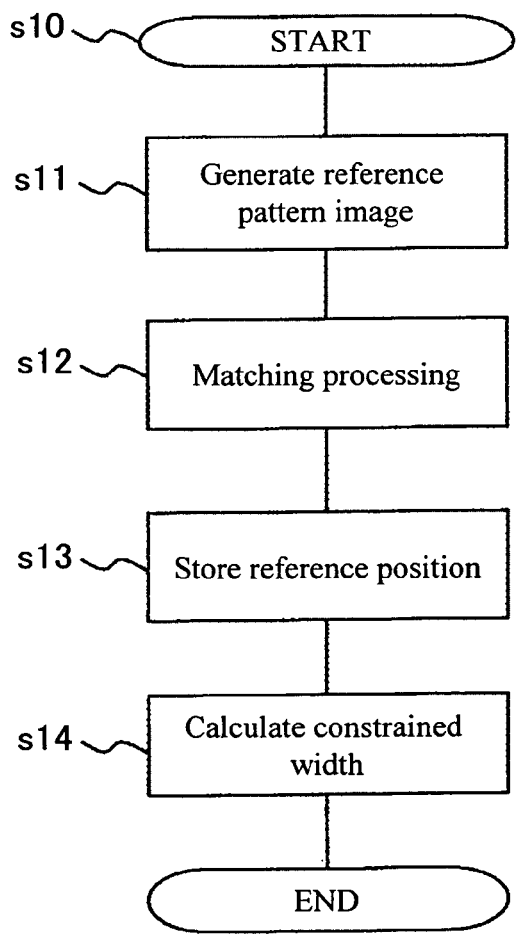
FIG. 4 shows a processing flow of a reference positioning stage of the present invention.

Next, the processing flow in the reference positioning stage of the present invention will be explained using FIG. 4.

An image is generated based on the design data in the generation of a reference pattern image in s11.

Figure 5:
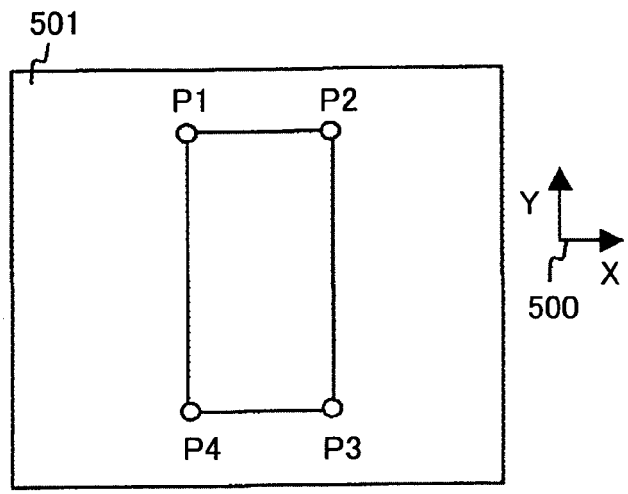
FIG. 5 shows an overview of converting design data to an image.

An example of generating an image based on the design data will be shown. For example, pattern 501 as shown in FIG. 5 is made up of four vertices P1 to P4. The design data describes line information expressing contours of a pattern shape represented by x and y coordinate values of the above described four vertices P1 to P4. The above-described x and y coordinate values are expressed by an arbitrary reference coordinate system 500 and have units such as nanometers. A pattern image is generated using the information in such design data. Furthermore, lines may be determined to be white or black in accordance with the image. Lines may also be deformed. Here, the image generated based on the design data is assumed to be a reference pattern image.

Matching processing is performed between the reference pattern image created based on the design data through the matching processing in s12 and the divided pattern image. In the case of an image divided into nine portions, matching is performed on each of the nine images. If the divided pattern image corresponding to the imaging position is known, it is possible to narrow down the matching positions corresponding to the design data according to the arrangement of the nine images.

In the storage of the reference position in s13, the respective matching positions of the divided pattern images obtained are stored as reference positions.

Figure 6:
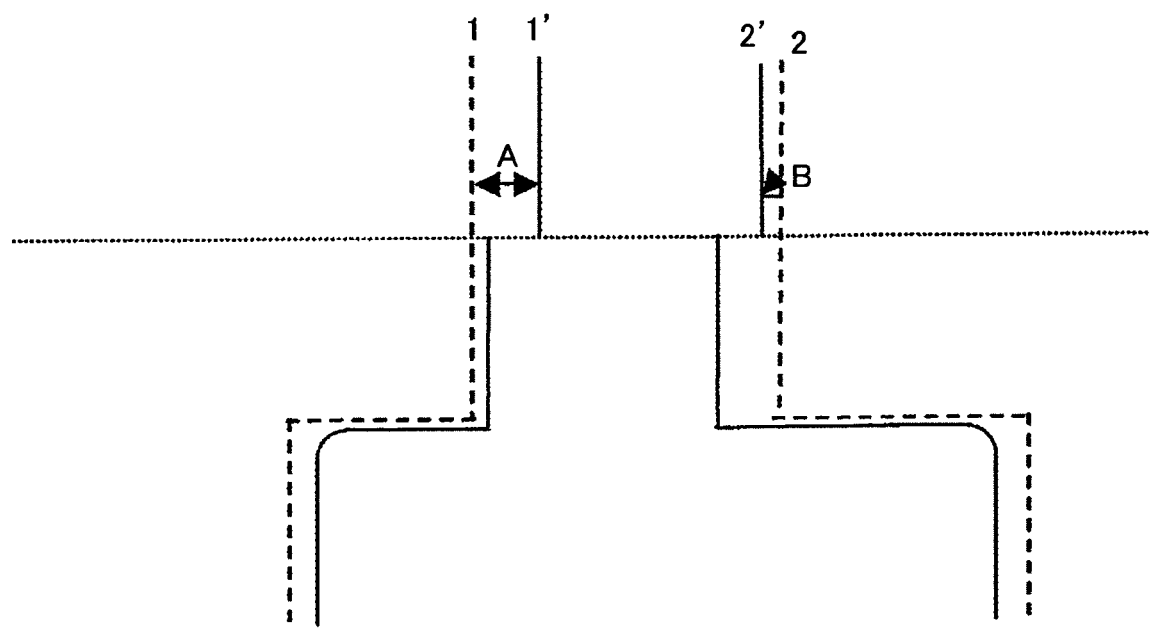
FIG. 6 shows a mismatch of a pattern in an overlapping region.
Figure 18:
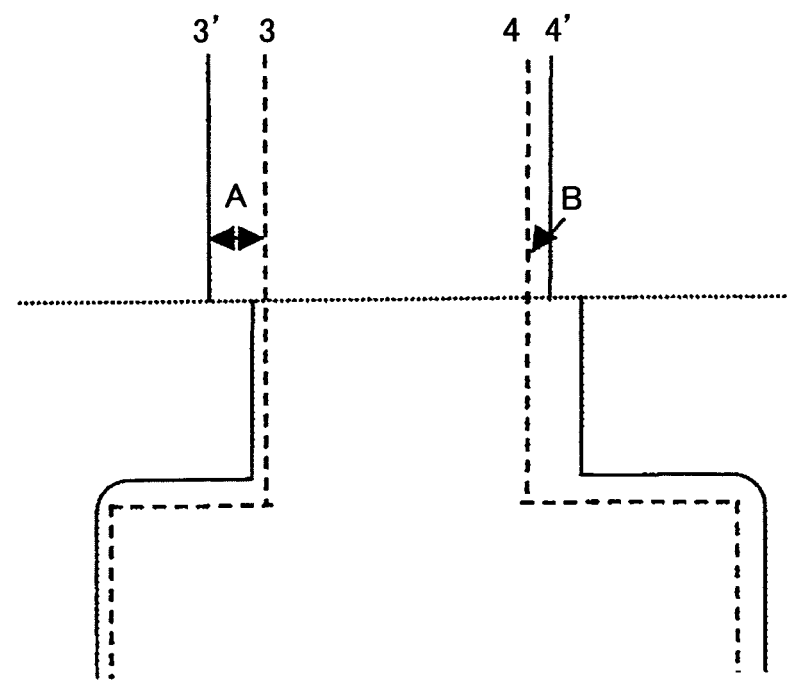
FIG. 18 shows thinning or thickening of a pattern.

A difference between patterns of the divided pattern image obtained in the calculation of constrained width in S14 and a reference pattern image is determined and stored. When, for example, images are pasted together in the vicinity of breaks of the images or the overlapping region, if the pattern becomes as shown in FIG. 6, the difference between the pattern of the reference pattern image (dotted line (1)) and the pattern of the divided pattern image (solid line (1)') is "−A" and the difference between the pattern of the reference pattern image (dotted line (2)) and the pattern of the divided pattern image (solid line (2)') becomes "B." The neighboring divided pattern image also matches the reference pattern image and the pattern of the neighboring divided pattern image is also considered to be within the pattern width of the reference pattern image. Therefore, when the difference is "−A" and "B," even if there is a mismatch, there can also be a pattern of the divided pattern image neighboring from the reference position to the range of −A to +B. Differences between patterns of divided pattern images are likewise determined in the respective overlapping regions. Furthermore, the imaged image pattern is thinner than the pattern of the design data here, but the pattern may actually be thicker as shown in FIG. 18. When the image pattern is thicker, the difference between the pattern of the reference pattern image (dotted line (3)) and the pattern of the divided pattern image (solid line (3)') becomes "A" and the difference between the pattern of the reference pattern image (dotted line (4)) and the pattern of the divided pattern image (solid line (4)') becomes "−B." In this case, there can also be a pattern of the divided pattern image neighboring from the reference position to the range of A to −B. The difference between these patterns is stored as a constrained width.

Figure 7:
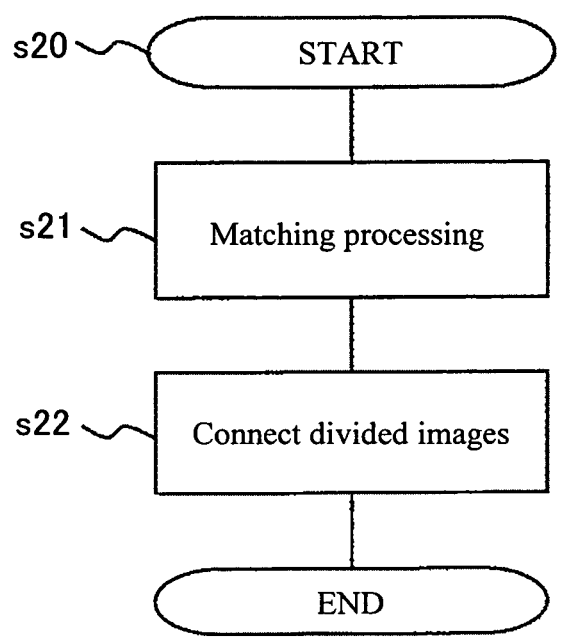
FIG. 7 shows a processing flow in an image position mismatch correction stage of the present invention.

Next, the processing flow of the image position mismatch correction stage according to the present invention will be shown using FIG. 7.

In the matching processing in s21, matching processing is performed in the overlapping region between neighboring images of the imaged pattern images. The width of the overlapping region may be a MAX value of imaging errors, for example.

Figure 17:
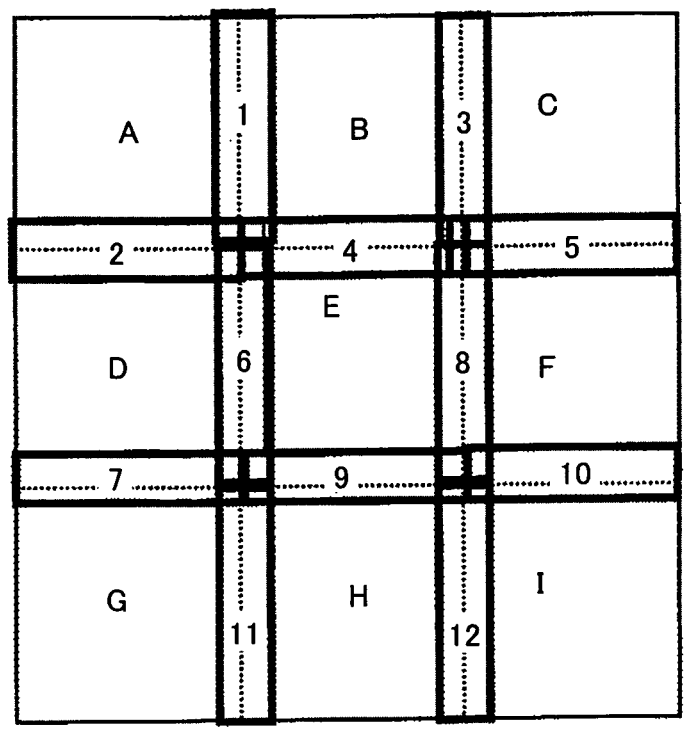
FIG. 17 shows an overlapping region between images.

Furthermore, suppose the position of a reference to be searched is the reference position determined in s12. Furthermore, suppose the searching range is the value of the constrained width determined in s13. For example, (when the pattern of the imaged pattern image is thinner than the pattern of the design data) it is assumed that the pattern of the imaged pattern image is surrounded by the pattern of the design data shown by dotted lines in FIG. 2(e) or (when the pattern of the imaged pattern image is thicker than the pattern of the design data) the pattern of the design data is inside the imaged pattern image and matching is performed within the range. Furthermore, when matching is performed, for example, when nine images are connected, there are twelve overlapping regions (1) to (12) as shown in FIG. 17. The evaluated value in this case can be a total value of matching rates at twelve locations. Furthermore, even if constraints are provided, performing matching at twelve locations on a round-robin basis takes time. As the method of reducing the matching time, matching may be determined through a multi-point search such as GA. Furthermore, matching is performed at locations where there are features in overlapping regions, pasting positions are confirmed about those locations, and a round-robin system is then introduced only for locations where there are no features in overlapping regions and matching is performed, and it is thereby possible to realize speed enhancement.

In the connection of divided images in S22, images are connected at the matching positions determined in S21 to create one image.

Figure 8:
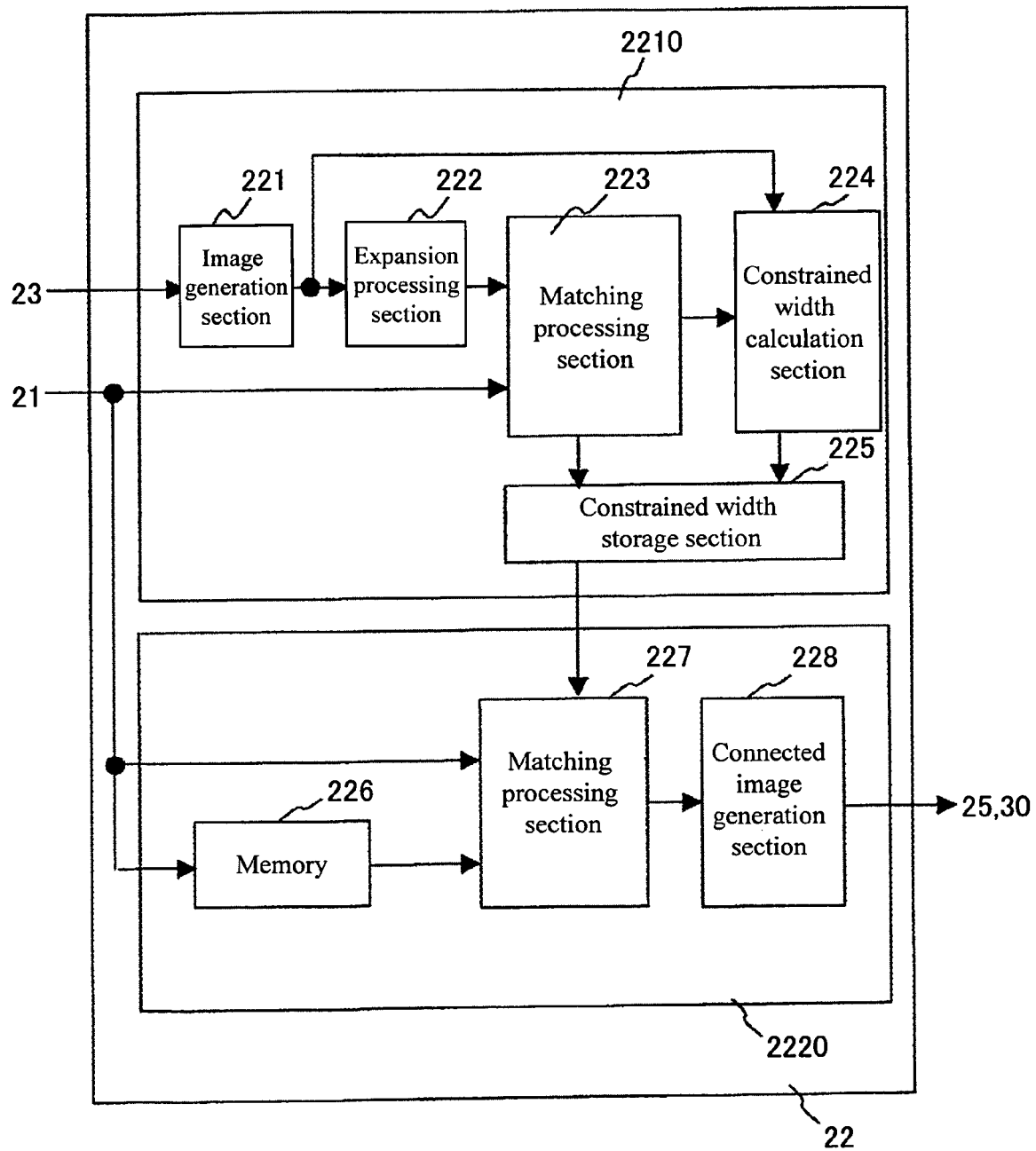
FIG. 8 shows a configuration example of the image connecting means of the present invention.

Next, a configuration example of the image connecting means of the present invention will be shown using FIG. 8. The image connecting means 22 is roughly constructed of a reference positioning section 2210 and an image position mismatch correction section 2220.

The reference positioning section 2210 reads the design data from the design data storing means 23 and an image generation section 221 converts the design data to a pattern image. The converted pattern image is assumed to be a reference pattern image here. The pattern of this reference pattern image is then expanded by an expansion processing section 222. A matching processing section 223 matches the expanded reference pattern image and the imaged divided pattern image. Expansion processing is performed to realize matching favorably. A constrained width calculation section 224 causes the divided pattern image to overlap with the reference pattern image before expansion at the matching position and determines the difference in pattern width of the overlapping region. This has already been explained using FIG. 6 and will therefore be omitted. The determined reference position and constrained width are stored in a constrained width storage section 225. The image position mismatch correction section 2220 reads the divided pattern image from the image memory 21, stores part thereof in a memory 226 and a matching processing section 227 performs matching processing between the divided images. In this matching, parameters of an initial value (starting point) of matching and a matching searching range (constrained width) are read from the constrained width storage section 225. When, for example, the constrained widths as shown in FIG. 6 are "−A" and "B," "−A to +B" is assumed to be the searching range. Based on the matching position of each divided pattern image determined in the matching processing section 227, the connected image generation section creates a connected image of each divided pattern image.

However, there is a possibility that an error in size corresponding to the constrained width may occur. If there is a pattern with features in the overlapping region, matching can be confirmed. Therefore, the imaging position may be changed so that a pattern with features falls within the overlapping region.

Figure 9:
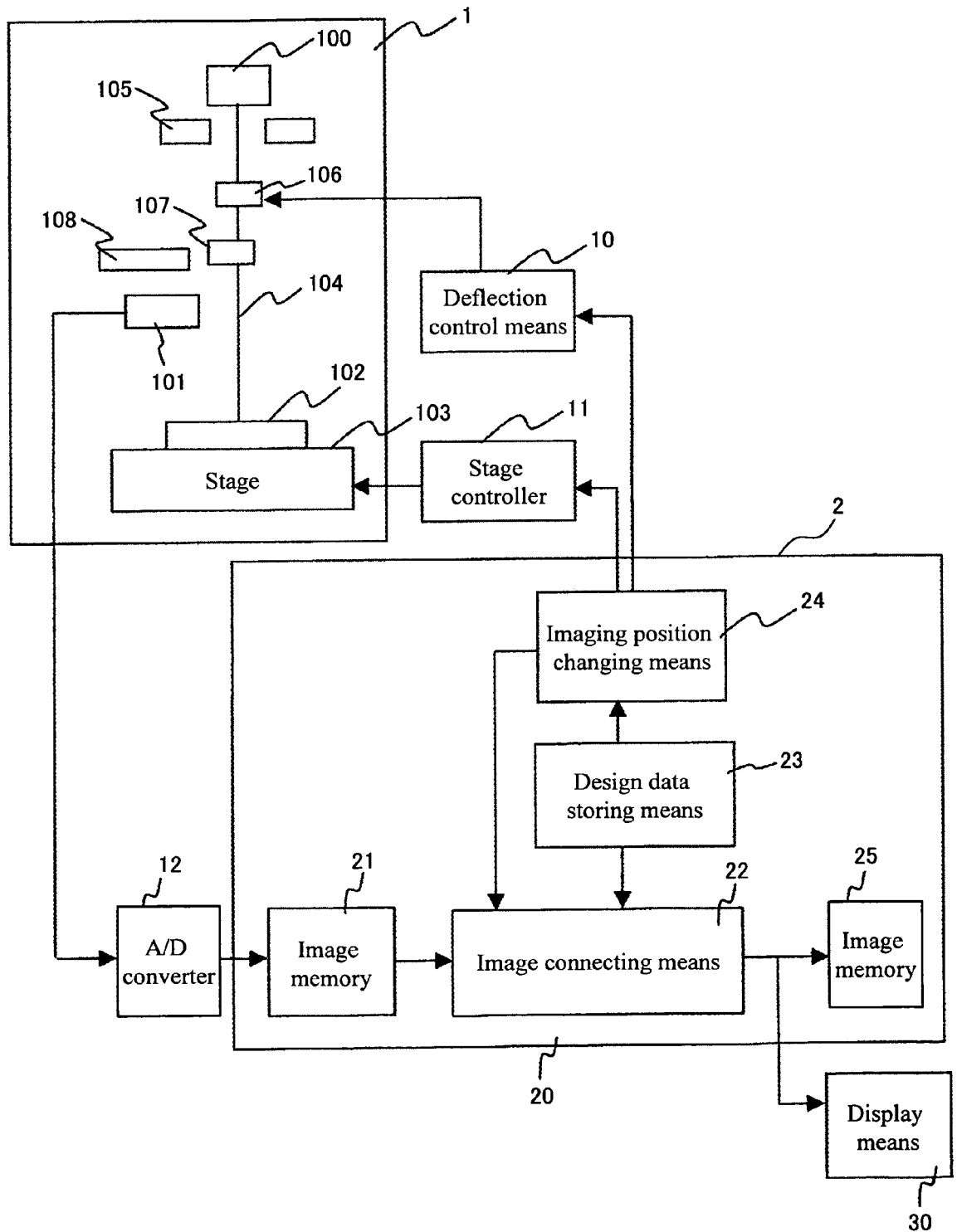
FIG. 9 is a block diagram showing an apparatus configuration of the present invention.

Next, the apparatus configuration for changing the imaging position of the present invention will be explained using FIG. 9.

The electron optical system 1 has already been explained in FIG. 1, and therefore explanations thereof will be omitted. The design data including the patterns to be imaged is incorporated from the design data storing means 23 into imaging position changing means 24, converted to an image, it is decided whether or not there is a feature by watching at the overlapping region of the converted image and an overlapping region including more features is searched. If there is an overlapping region including more features, the stage controller 11 and/or deflection control means 10 are/is instructed so that the imaging position corresponds to the determined overlapping region. Furthermore, when the imaged divided images are connected, the size of the overlapping region is reported to the image connecting means 22 for each divided image.

Figure 10:
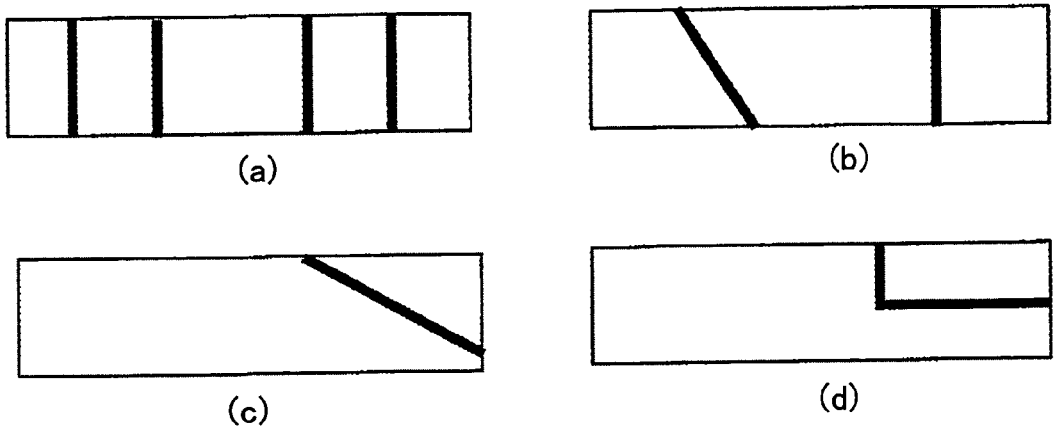
FIG. 10 shows an overview of a feature pattern.

Next, a pattern with features when judging whether or not there is any feature will be explained using FIG. 10. For example, there are four line segment patterns in FIG. 10(a), but since all line patterns are in the same vertical direction, when matching processing is performed, matching points in the horizontal direction can be identified, but matching points in the vertical direction cannot be identified. FIG. 10(b) shows two line segment patterns, but since their directions are different, the vertical direction and the horizontal direction can be identified. In FIG. 10(c), the diagonal direction can be identified with the diagonal line, but the vertical direction and the horizontal direction cannot be identified. The patterns in FIG. 10(d) are connected as one line, but since there are lines in two directions, both the vertical direction and the horizontal direction can be identified. Therefore, the reference as to whether or not there are any features can be decided based on whether or not there are two or more lines in different directions. For this reason, when information of the design data are vertex coordinates of closed graphics, the direction of a line connecting one vertex to another can be easily determined. If positions at which imaging is performed are predetermined at a point in time at which a pattern image is generated, it is possible to decide whether or not the pattern falls within an overlapping region, and therefore it is also possible to know the number of lines connecting one vertex to another which fall within the overlapping region. That is, the number of lines existing in the overlapping region, their respective directions and angles can also be easily known. Therefore, the presence/absence of a pattern with any features is decided based on the presence/absence of two or more line segments in different directions in the overlapping region. Furthermore, line segments are assumed here, but pattern shapes can also be adopted. For example, it is possible to calculate the amount of edges in different directions such as vertical, horizontal and diagonal directions and identify the direction of the pattern. Here, suppose the "amount of edges" refers to output of filter processing. For example, the amount of edges can be values obtained based on the output of Laplacian filter processing, vertical, horizontal, diagonal soble filter processing.

Figure 11:
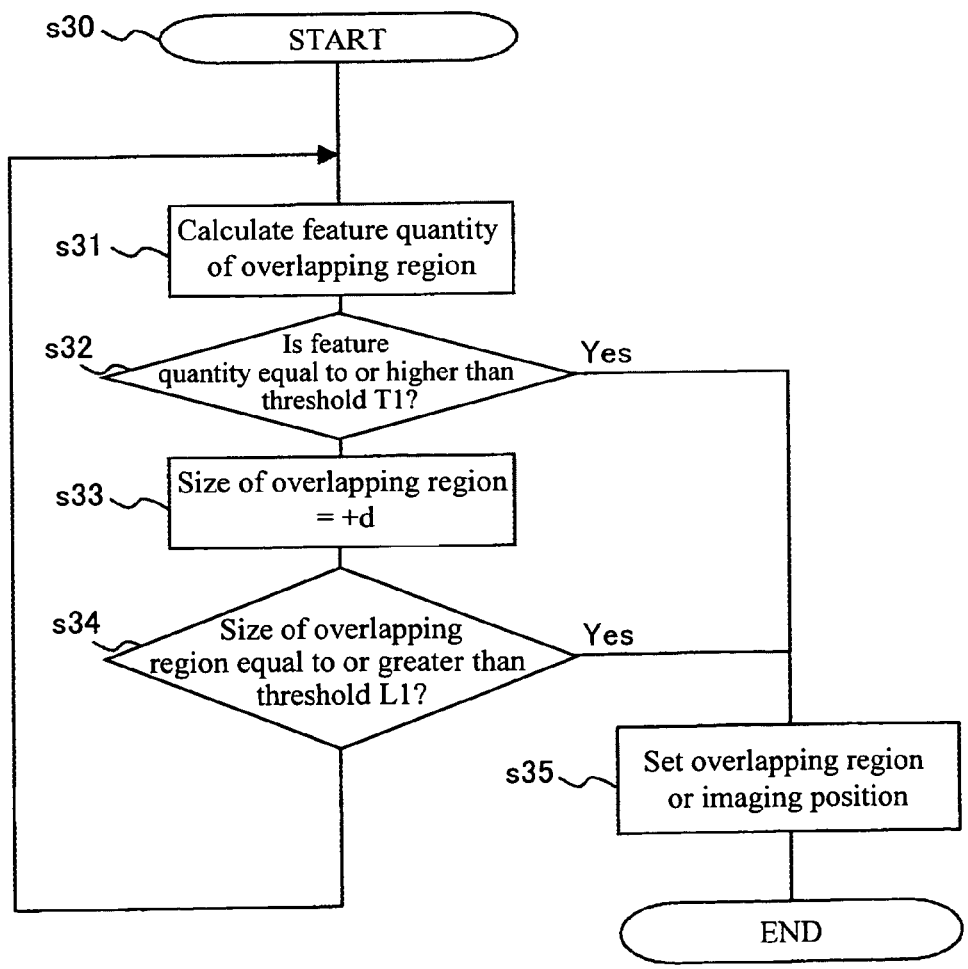
FIG. 11 shows a processing flow of the imaging position changing means of the present invention.

The processing flow of the imaging position changing means of the present invention will be explained using FIG. 11. In S31, the feature quantity of a pattern included in an overlapping region will be calculated using design data. Suppose the feature quantity here is the number of line segments in different directions that exist in the overlapping region. It is decided in S32 whether or not the feature quantity is equal to or higher than a threshold T1, and when the feature quantity is equal to or higher than the threshold T1, the width of the current overlapping region is stored in s35 and the imaging position corresponding to the overlapping region is determined. Here, suppose the threshold T1 is the number of line segments in different directions and the value is 2. When the feature quantity is not equal to or higher than the threshold T1, the size of the overlapping region is incremented by +d in S33. In S34, it is checked that the size of the current overlapping region is not equal to or greater than an upper limit value L1 and if the size of the current overlapping region is equal to or greater than the upper limit value L1, the overlapping region is assumed to be L1 and the width of the current overlapping region is stored in S35 and the imaging position corresponding to the overlapping region is determined.

Furthermore, the size of the current overlapping region is not the upper limit value, the feature quantity of the pattern included in the overlapping region is detected in S31 and the above described processing is repeated.

Figure 12:
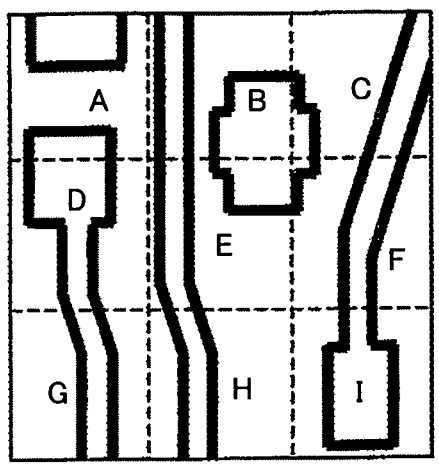
FIG. 12 is a block diagram of the apparatus configuration of the present invention.
Figure 12:
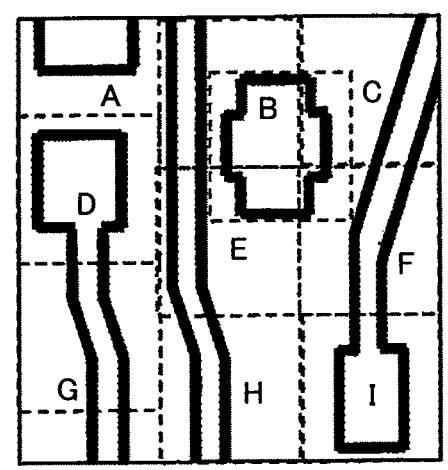

Furthermore, the locations that are preferably checked through a simulation are assumed to be locations where problems are most likely to occur and there may be cases where not all locations are necessary. When, for example, there is a wiring pattern as shown in FIG. 12(a), images at locations of interest may be imaged such that the locations do not fall within the overlapping region (break) between images. When, for example, when attention is preferably focused on the location where two lines form 90° as in the case of angles of a rectangle, imaging may be performed so that the angles of the rectangle fall within one image divided in FIG. 12(b). Parts that need not receive much attention may be located in any place of the image, and therefore the imaging positions of other parts may be shifted so that the locations of interest come to the center of the image or parts of no interest may be acquired separately after acquiring the divided images uniformly as shown in FIG. 12(a). Avoiding the parts of interest from falling within a break (overlapping region) can prevent influences of the matching accuracy.

Figure 13:
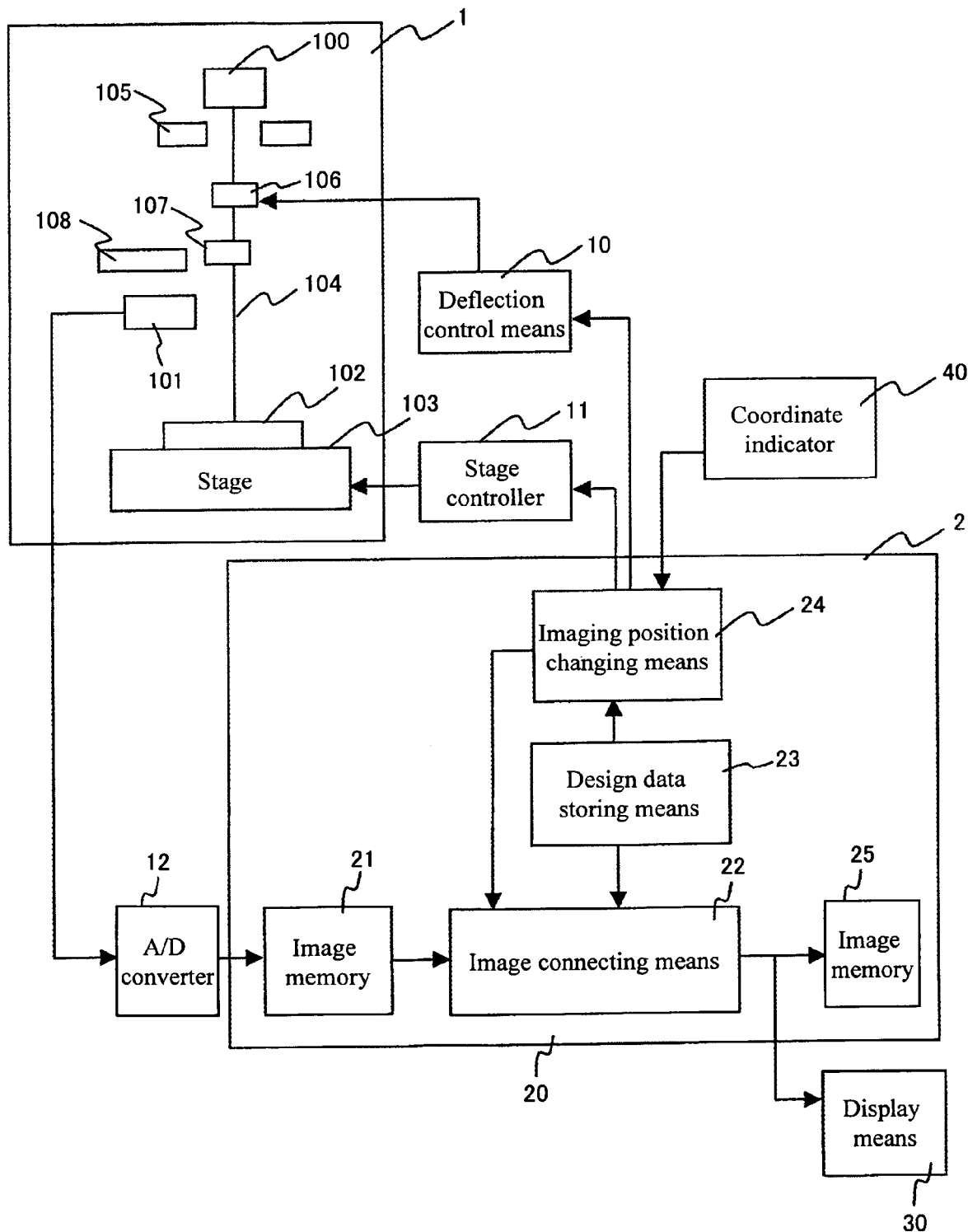
FIG. 13 is a block diagram of the apparatus configuration of the present invention.

In this case, as shown in FIG. 13, the user may specify coordinates of the region of interest. Here, when the user indicates coordinates using a coordinate indicator 40, the imaging position changing means 24 determines the imaging position so that the region of the indicated coordinates is located in the center of the divided image to be imaged, and the deflection control means 10 and the stage controller 11 cause the changing means 24 to change the imaging position. In this case, the user may indicate coordinates while watching the image based on the design data on the display screen or the like. The imaging position determined by the imaging position changing means 24 is the imaging position at which the region indicated by the coordinate indicator 40 comes to the center of the imaged image.

Here, although the above explanation describes that the user gives an instruction, a pattern of interest is often a pattern identified to a certain degree. Therefore, as shown in FIG. 14, patterns of interest are registered with a pattern registration section 26 beforehand, it is decided whether or not the pattern falls within a range of an image to be acquired and if the pattern exists within the range, the imaging position may be changed so that the pattern is located in the center of the image.

The decision as to whether or not there exists the pattern can be realized through general matching processing. Matching processing is performed between the pattern of interest and a pattern image converted from the design data including the pattern to be acquired, and when the matching value is high, it is decided that there is a pattern of interest at that position and the imaging position is changed or set to the central imaging position when the pattern of interest at that position is imaged.

Figure 14:
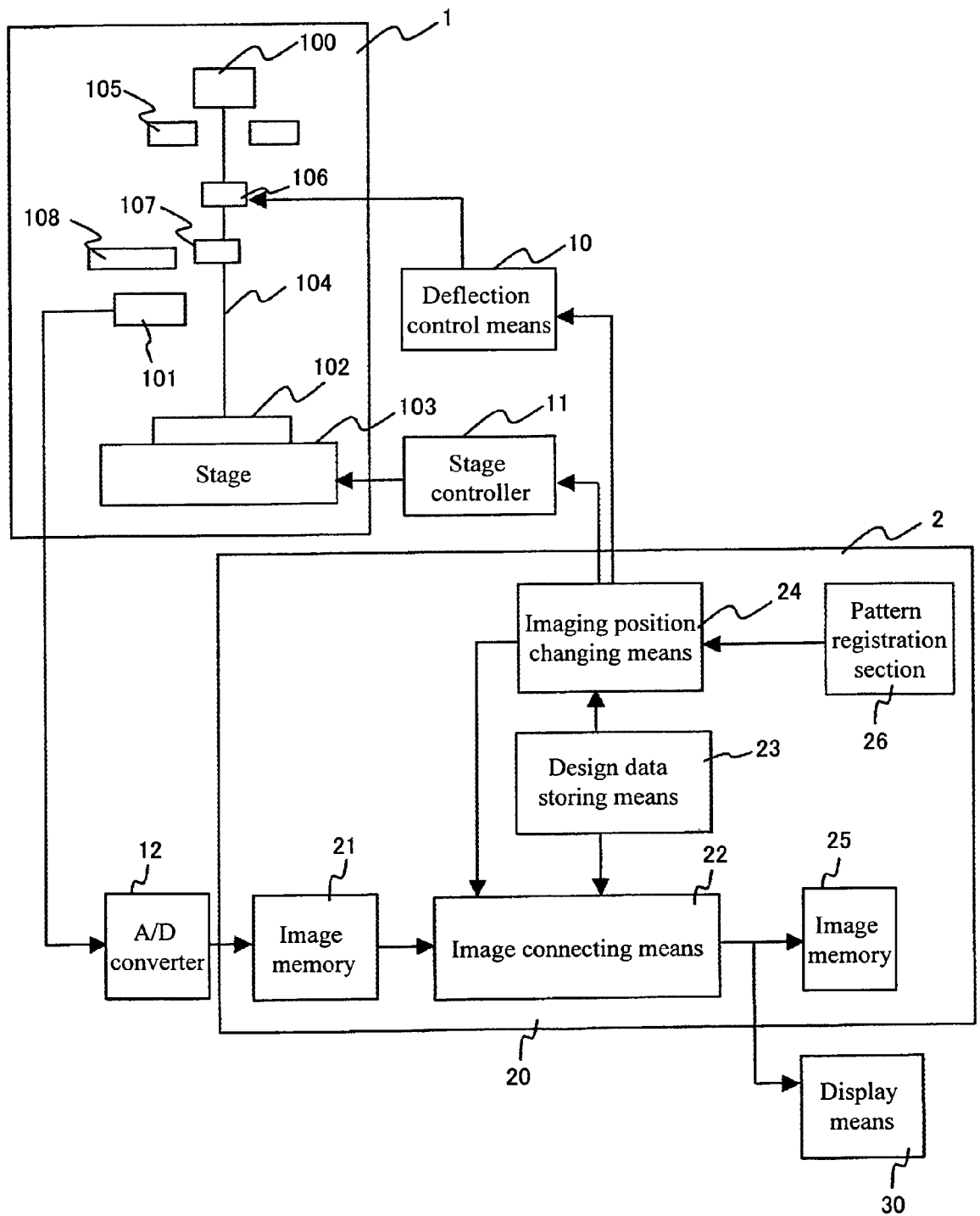
FIG. 14 is a block diagram of the apparatus configuration of the present invention.

Here, in FIG. 13 and FIG. 14, the pattern of interest is identified by the user's instruction or in the matching with registered patterns and the imaging position is changed such that the pattern of interest is located in the center, but the identification of the pattern of interest is not limited to this and, for example, the pattern with features may be located at a break (overlapping region) of the image. That is, a pattern with features may be identified by the user's instruction or through matching with the registered patterns and the imaging position may be changed such that the pattern with features is located at the break (overlapping region) of the image. This pattern with features may be assumed to be the pattern explained using FIG. 10.

Furthermore, it takes time and effort for the user to set the number of divided images necessary for image connection processing beforehand. However, whether or not the image connection processing is necessary or the number of divided images required is self evident from the range of one image at the magnification at which imaging is performed and the range of the image the user wants to acquire.

Figure 15:
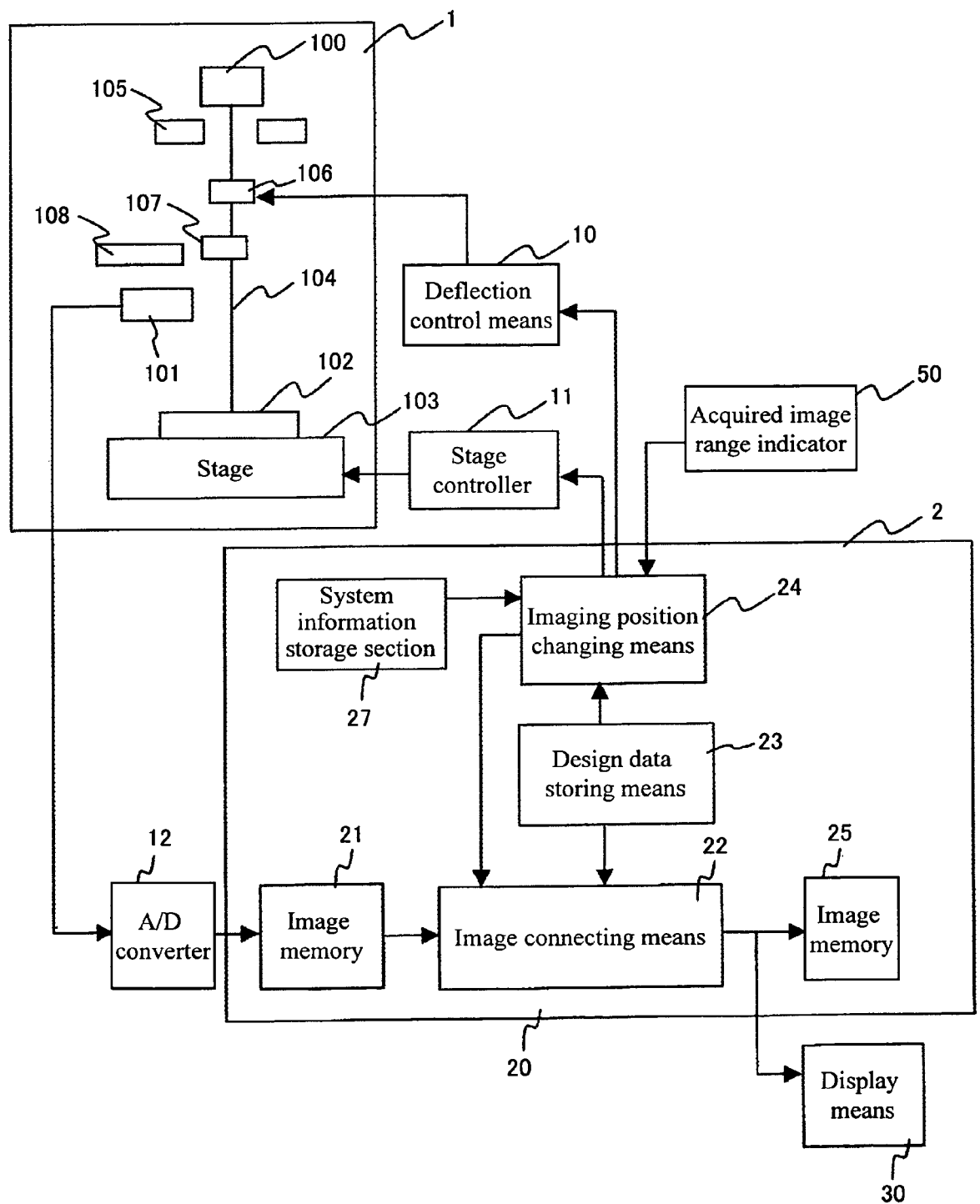
FIG. 15 is a block diagram of the apparatus configuration of the present invention.

When the range of the image the user wants to acquire is greater than the range of one image at the magnification at which imaging is performed, it is obvious that image connection processing is necessary. Furthermore, when only the horizontal direction is considered, the necessary number of divided images can be calculated, for example, from the (width of the image the user wants to acquire/width of one image at magnification at which imaging is performed−width of the overlapping region). For example, an acquired image range indicator 50 may be provided as shown in FIG. 15 and the user may set the range of an acquired image. The range of one image at imaging magnification may also be set by the user or the information may be stored in the system information storage section 27. The imaging magnification may be limit performance of the imaging apparatus. The system information storage section may then be a fixed value.

Figure 16:
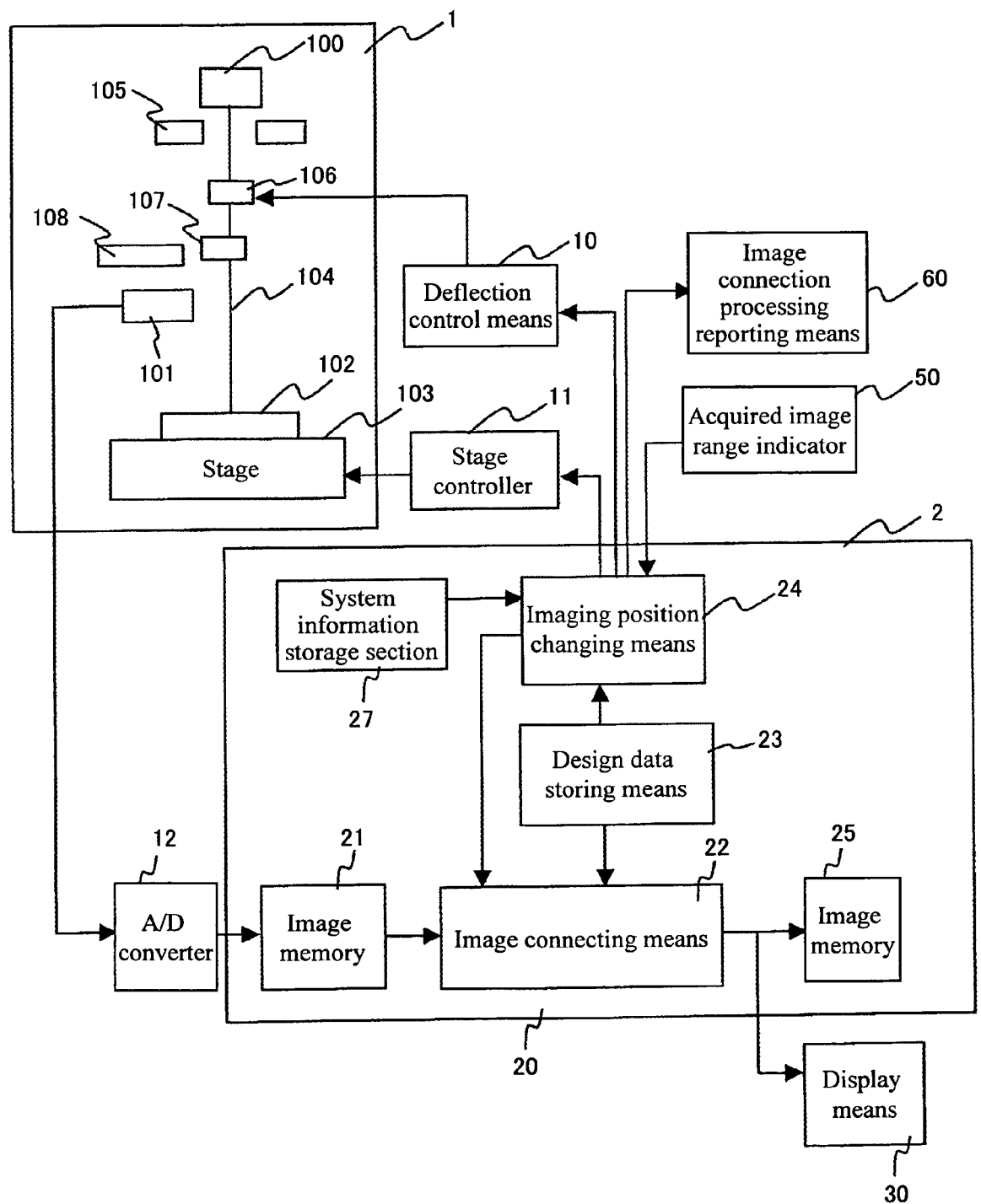
FIG. 16 is a block diagram of the apparatus configuration of the present invention.

Furthermore, when images are automatically connected but not connected well, it is necessary to be able to judge whether the images are actually not connected or not connected because of the accuracy of matching in the image connection processing. For this reason, image connection processing reporting means 60 is provided as shown in FIG. 16 to report, when image connection processing is performed, the fact that image connection processing has been performed. For example, an LED may be lit or data may be written into a file. Furthermore, when a connected image is displayed on the display apparatus 30, it may be possible to make clear that the image is a connected image subjected to image connection processing.

Furthermore, the accuracy at the position of connection may be visually checked by displaying the first or last one or a plurality of pixels of the connected image in different colors or brightness or displaying them with a line or marker or the like.

Furthermore, a series of imaging positions of divided images obtained based on the design data according to the imaging range may be obtained and stored beforehand. By so doing, the imaging positions stored during imaging may be read and imaging may be performed.

Furthermore, an image obtained by the secondary electron detector has been shown in the above described embodiment, but it is also possible to use an image generated using secondary reflected electrons when an electron beam is irradiated onto the sample 102.

Furthermore, the image processing section 2 of the present invention may be performed through software processing in the above described embodiment. Furthermore, in that case, software processing may be performed using a personal computer or the image processing section 2 can be incorporated into an LSI and can also be performed through hardware processing.

As described above, since there are many monotonous images in wiring patterns according to the present invention, pasting positions may not be identified by only image data. On the other hand, when an imaged wiring pattern is inspected, the wiring pattern is inspected using the design data describing layout information of the electronic device pattern. The pasting positions between divided images can be narrowed down and identified using this design data. The design data allows pattern information around a location of interest to be obtained and referenced without imaging.

First, a stage is provided in which overlapping regions where neighboring image regions overlap each other are provided, an electronic device pattern is divided and imaged, and matching processing is performed between a plurality of divided pieces of image data obtained and design data corresponding to the positions of the respective imaged divided images, and pasting positions are roughly determined. When the respective images subjected to matching processing are arranged with reference to the design data (so that all design data are connected), there may be locations where some images are not connected. Although the imaged images are created based on the design data, it is not possible to obtain completely matching images. Therefore, images mismatch to a certain degree even after performing matching processing. Therefore, a stage is provided in which matching processing is performed using image data in the overlapping region between the divided images. In this case, an amount of mismatch between each image and design data is calculated, matching processing is performed within the range of the amount of mismatch calculated using the pasting position determined by matching the design data with the image as an origin and the pasting position is thereby identified.

Furthermore, even if all images seem to be connected by a visual check, as long as there exists a mismatch between design data and an image, the connected image may not match the actual image. Therefore, it is preferable to make patterns with features exist in the overlapping region between images whenever possible. "Features" are expressed as the amounts of edge in vertical, horizontal and diagonal directions or the number of vectors and/or directions and means for deciding the presence/absence of decisions on patterns with features to decide whether these values become equal to or greater than a specific value is provided. When the decision result shows that there are patterns with features, imaging is performed at the current imaging position and when the decision result shows that there are no patterns with features, the length of the overlapping region where the patterns with features exists is calculated, the imaging position is changed such that the length of the overlapping region is obtained and imaging is performed. It is possible to determine what pattern exists at the imaging position beforehand with reference to the design data, and it is thereby possible to use image data of an overlapping region with features and improve the accuracy of matching processing by changing the imaging position using the imaging position control means for moving the stage to the imaging position based on the design data. Furthermore, the imaging positions or the like determined based on the feature pattern deciding means beforehand are stored for a series of imaging positions where imaging is performed for a simulation.

Furthermore, locations to be checked through a simulation are assumed to be locations where problems are most likely to occur and there may be cases where not all locations are necessary. For example, as for the locations of interest, the imaging position is changed by the imaging position control means for moving the stage to a position where imaging is performed based on the design data corresponding to the imaging position such that the locations do not fall within the overlapping region (break) between images but are in the center of the screen, and it is thereby possible to prevent influences of the matching accuracy for the locations of interest.

Furthermore, the imaging position control means decides whether or not image connection processing is necessary based on the range of inspection and information of imaging resolution of the imaging means, and can thereby set the imaging position and the number of reading times, and the user needs only to set the range of inspection and imaging resolution so as to be able to automatically set appropriate imaging positions and number of reading times or the like, perform imaging, apply image connection processing and obtain connected images and thereby improve operability, too.

What is claimed is:

1. An image generation method for an electronic device pattern using an electron microscope, comprising the steps of:
    storing design data which describes layout information of the electronic device pattern;
    storing a plurality of divided pieces of image data obtained by imaging the electronic device pattern while varying imaging positions;
    performing a first matching processing for aligning between the plurality of divided pieces of image data and the layout information of the design data;
    performing a second matching processing for aligning between adjacent pieces of the divided pieces of image data for which the first matching processing has been preformed; and
    connecting the plurality of divided pieces of image to generate one image based on a result of the second matching processing.

2. The image generation method according to claim 1, wherein when the image connection is performed, a parameter to be used in the second matching processing is determined in the first matching processing.

3. The image generation method according to claim 1, wherein when the image connection is performed, a parameter of the second matching processing determined in the first matching processing is information about a reference position and a searching range.

4. An image generation apparatus for an electronic device pattern using a plurality of divided pieces of images data obtained by an electron microscope, comprising:
    an image data memory medium which stores the plurality of divided pieces of the image data, wherein each image data has been obtained at a different imaging position and a part of the imaging positions are overlapped; and
    an image connection module configured to perform steps of:
    performing a first matching processing for aligning between the plurality of divided pieces of image data and layout information of design data;
    performing a second matching processing for aligning between adjacent pieces of the divided pieces of image data for which the first matching processing has been performed; and
    connecting the plurality of divided pieces of image to generate one image based on a result of the second matching processing.

5. The image generation apparatus according to claim 4, wherein the image connecting module obtains a parameter to be used in the second matching means using the first matching means.

6. The image generation apparatus according to claim 4, wherein a parameter of the second matching processing obtained using the first matching processing is information about a reference position and a searching range.

7. An image generation apparatus for an electronic device pattern using a plurality of images obtained by an electron microscope, comprising:
    an electron microscope having a sample stage, a deflector which deflects an irradiation position of an electron beam, and a controller which controls the sample stage and the deflector;
    a design data storing medium which stores design data describing layout information of an electronic device pattern;
    an image data memory medium which stores the plurality of images, wherein each image has been obtained at different imaging positions and a part of the imaging positions are overlapped; and,
    an image connection module configured to perform an alignment between the plurality of images and layout data based on design data to form a connected image based on the alignment result;
    wherein the image connection module determines a relative moving range between the layout data and the images, based on a difference between edges of the layout data included in an overlapped region of the images and edges of the images, and performs a matching processing within the determined relative moving range to connect the plurality of images at positions adjusted by the matching processing.

8. The image generation apparatus according to claim 7, wherein the imaging position control module changes imaging conditions by:
    calculating and deciding a feature quantity of a region to be an overlapping region using design data including a pattern of the image to be imaged beforehand;
    calculating, when the feature quantity is smaller than a specific threshold, the size of the overlapping region in which the feature quantity increases; and
    performing an imaging by changing the imaging conditions so as to become the calculated size of the overlapping region.

9. The image generation apparatus according to claim 8, wherein the feature quantity calculated by the imaging position control module is a pattern shape or the number of patterns.

10. The image generation apparatus according to claim 9, wherein the imaging position control module detects a feature pattern based on design data including a pattern of an image to be imaged and changes the imaging conditions so as to obtain an overlapping region between images.

11. The image generation apparatus according to claim 9, wherein the imaging position control module changes the imaging position based on the design data including the pattern of an image to be imaged such that a part of interest comes closer to the center of the image.

12. An image generation apparatus for an electronic device pattern using a plurality of images obtained by an electron microscope, comprising:
    an electron microscope having a sample stage, a deflector which deflects an irradiation position of an electron beam, and a controller which controls the sample stage and the deflector;
    a design data storing medium which stores design data describing layout information of an electronic device pattern;
    an image data memory medium which stores the plurality of images, wherein each image has been obtained at different imaging positions and a part of the imaging positions are overlapped;
    an image connection module configured to perform an alignment between the plurality of images and layout data of the design data to form a connected image based on the alignment result; and
    an imaging position changing module which determines whether an edge of pattern included in an overlapping region of the images has line segments in at least two directions and generates a control signal for the sample stage and/or deflector so that the edge of the pattern included in the overlapping region includes the line segments in the at least two directions.

13. The image generation apparatus according to claim 12, wherein a report of the forming the connected image is sent to a user.

\* \* \* \* \*